United States Patent [19]

Patel

[11] Patent Number: 5,038,959
[45] Date of Patent: Aug. 13, 1991

[54] COFFEE LID

[75] Inventor: Dahyabhai U. Patel, Vancouver, Canada

[73] Assignee: Cafe 98 Industries Ltd., Canada

[21] Appl. No.: 498,607

[22] Filed: Mar. 26, 1990

[51] Int. Cl.⁵ ............................................. B65D 51/16
[52] U.S. Cl. .................................... 220/366; 220/374; 220/303
[58] Field of Search ............... 220/366, 367, 373, 374, 220/368, 360, 361, 303, 913, DIG. 27; 215/307

[56] References Cited

U.S. PATENT DOCUMENTS

| 1,819,279 | 8/1931 | Coyle | 220/366 |
| 2,562,010 | 7/1951 | Aitken | 220/366 |
| 2,682,970 | 7/1954 | Brothers, Jr. | 220/366 |
| 4,646,933 | 3/1987 | Jurczenia et al. | 220/366 |
| 4,739,898 | 4/1988 | Brown | |
| 4,770,318 | 9/1988 | Earl | 220/366 |
| 4,858,787 | 8/1989 | Stone | 220/374 |

Primary Examiner—Stephen Marcus
Assistant Examiner—Paul Schwarz
Attorney, Agent, or Firm—Nixon & Vanderhye

[57] ABSTRACT

A thermal beverage container and a lid therefor are provided. The container includes an insulated reservoir for storing and dispensing liquid. A spout is located at the base of the container and is in communication with the reservoir. A dispensing arm is operable to open a valve upon actuation thereof to permit liquid to be expressed from the reservoir via the spout. The container has an open upper end onto which a lid is threadedly secured. The open upper end of the container defines a neck of reduced diameter relative to the reservoir. The neck has a groove formed therein which extends from the reservoir to the upper surface of the container. The lid is complementary to shape to the opening in the container and thus, includes a plug for seating in the neck. However, the groove is not filled by the plug. A funnel-shaped, centrally located passage is formed through the lid and supports a floatable ball. The passage permits liquid to be poured into the insulated reservoir without removal of the lid. A vent hole radially displaced from the passage is also formed through the lid and communicates with the groove to improve air flow from the reservoir to the exterior of the container upon the pouring of fluid therein.

13 Claims, 3 Drawing Sheets

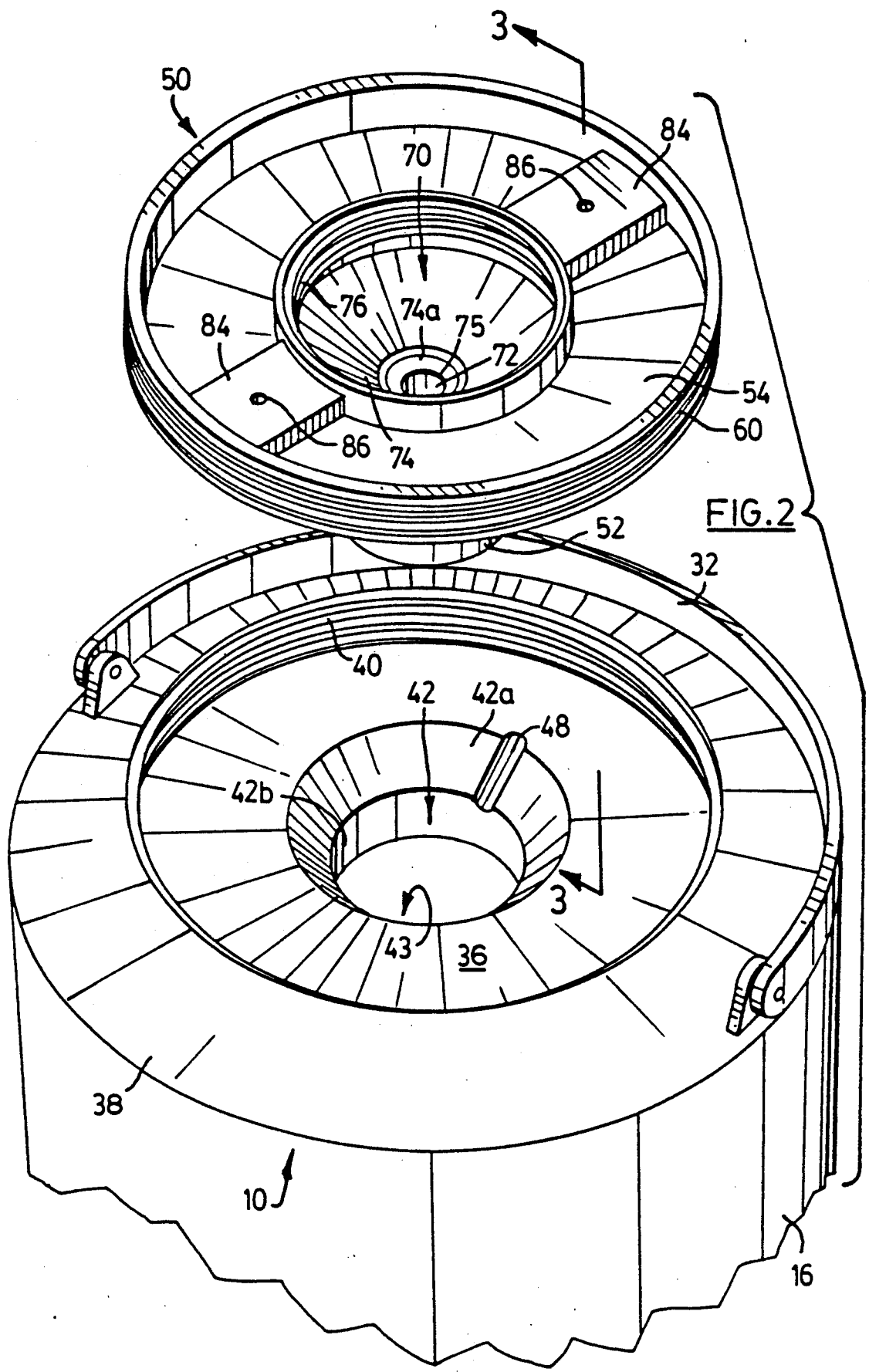

COFFEE LID

The present invention relates to a beverage container and, in particular, to a thermal beverage container and a lid therefor.

Thermal containers for beverages are known in the art. Conventional containers include a reservoir having an open upper end onto which a lid is placed. A liquid dispensing spout is located adjacent the basal end of the reservoir and is operable to dispense liquid from the reservoir upon actuation of a valve. When it is desired to use these conventional containers, the lid is removed from the container so that the liquid can be poured into the reservoir via the open upper end. Once this has been completed, the lid is placed back on the container to cover the open end so that heat loss of the liquid is reduced.

Other thermal containers have been developed which allow filling of the container reservoir without requiring the lid covering the container to be removed. A container of this type is described in U.S. Pat. No. 4,739,898, issued Apr. 26, 1988. The present invention is directed towards a container having a lid of this type.

It is an object of the present invention to provide a novel lid for a thermal container.

According to the present invention, there is provided in combination a container to be filled with liquid having an upper end and a lid removeably securable to said container to cover said upper end, said container having a passage formed through said upper end to provide an opening to a reservoir disposed within said container, a wall of said passage having a groove formed therein extending the length thereof, said lid including:

a plug for seating in said passage;

a liquid entrance formed in said lid and extending through said plug to permit fluid to enter said reservoir without removal of said lid from said container; and vent means provided through said lid, said vent means communicating with said groove when said lid is secured to said container whereby said groove and vent means provide a path for the expression of air from said reservoir when fluid enters said reservoir via said liquid entrance.

Preferably, the vent means is in the form of a pair of diametrically opposed recesses formed in the undersurface of the lid and a pair of bores extending through the lid with each bore being associated with one of the recesses. One of the recesses overlies the passage when the lid is secured to the container.

It is also preferred that the liquid entrance is in the form of a funnel-shaped passage having its reduced diameter end extending through the plug and a floatable ball resting in the passage so that the reduced diameter end is sealed in the absence of fluid entering the container via the liquid entrance.

Preferably, a cap having a small hole provided therethrough overlies the funnel-shaped passage to inhibit removal of the floatable ball and to limit spillage in the event of accidental overturning of the container.

The present container and lid therefor is particularly suitable for use with the coffee machine described in Applicant's co-pending U.S. patent application filed on Jan. 25, 1989 and issued Ser. No. 301,116.

An embodiment of the present invention will now be described by way of example only with reference to the accompanying drawings in which:

FIG. 2 is an enlarged, exploded, top perspective view of the container illustrated in FIG. 1;

Figure 1:
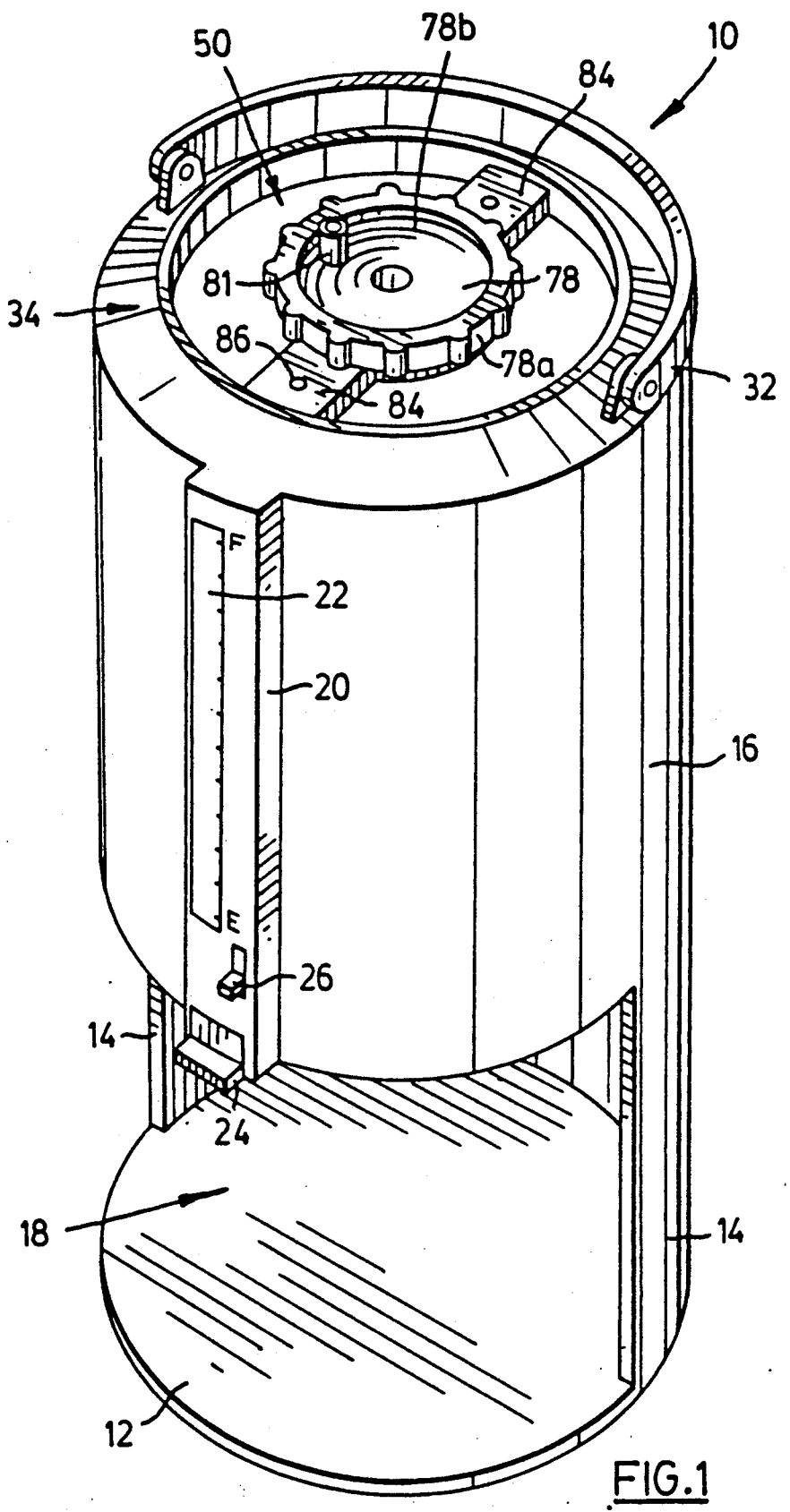
FIG. 1 is a perspective view of a thermal container having a removeable lid.
Figure 4:
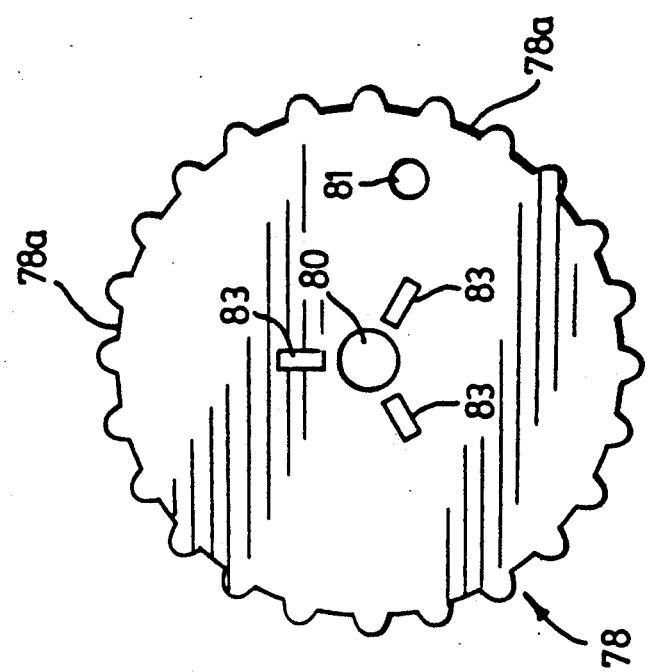
FIG. 4 is a bottom plan view of a portion of the lid shown in FIG. 1.
Figure 3:
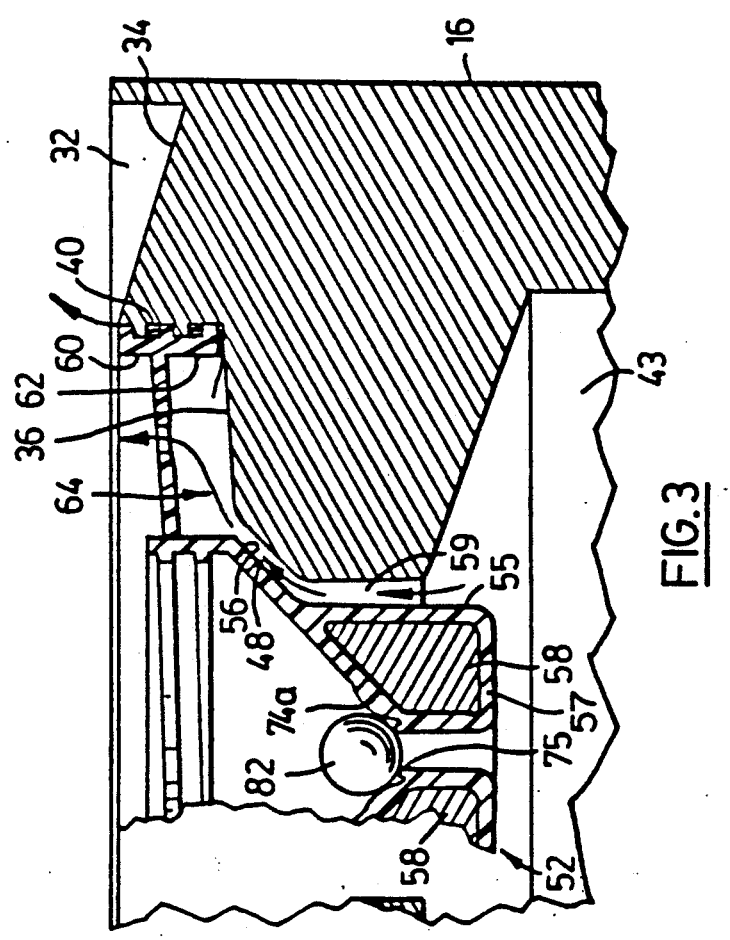
FIG. 3 is a partial sectional view of a portion of the container shown in FIG. 2 taken along line 3—3.

Referring now to FIGS. 1 to 4, a thermal beverage container for storing liquid refreshments and in particular hot coffee is shown and generally indicated by reference numeral 10. The container 10 includes a circular base 12 supporting an upright semi-cylindrical wall 14. A cylindrical receptacle 16 is integrally formed with the top of the wall 14 and rests above the base 12. The opening 18 defined between the upper surface of the base 12 and the lower surface of the receptacle 16 permits the passage of cups so that the liquid contents stored in the receptacle 16 may be dispensed with facility as will be described.

The receptacle 16 has an elongate, longitudinally extending housing 20 integrally formed therewith which projects outwardly from the receptacle. The front wall of the housing 20 includes a window pane 22 for indicating the fluid level in the receptacle 16. A dispensing handle 24 is provided on the housing and is moveable vertically between inoperative and operative conditions to open and close a valve (not shown) located at the base of the receptacle 16. The valve is in communication with a spout (also not shown) provided on the base of the receptacle 16 which dispenses liquid from the reservoir 16 upon opening of the valve. A lock including a slidable arm 26 is also provided in the housing 20 to allow the dispensing handle 24 to be maintained in the inoperative condition.

The upper portion of the receptacle 16 includes an arcuate handle 32 having opposed ends pivotally connected to the body of the receptacle. The upper surface 34 of the receptacle 16 is better illustrated in FIG. 2 as can be seen and includes inner and outer vertically spaced concentric annular regions 36,38 interconnected by a threaded vertical wall 40. The inner annular region 36 defines a funnel-shaped passage 42 having a bevelled portion 42a and a cylindrical portion 42b extending to a thermal reservoir 43 disposed within the receptacle 16. A shallow groove 48 is formed in the wall of the bevelled portion 42a along its entire length to define a vent as will be described herein.

A lid 50 having a complementary shape to the upper surface 34 of the receptacle 16 is also provided. Accordingly, the lid includes a plug 52 integrally formed with a circular cover 54 which projects downwardly therefrom. The plug 52 has a cylindrical portion 55 and an outwardly flared portion 56. The cylindrical portion 55 of the plug 52 is dimensioned to pass into the cylindrical portion 42b of the passage so that a gap 59 is defined between the outer wall of the cylindrical portion 55 and the wall of the passage. The outwardly flaring portion 56 is shaped to overlie the bevelled portion 42a without filling the groove 48. The cylindrical and outwardly flaring portions 55,56 respectively are hollow and define a cavity 58. A cap 57 is permanently affixed to the bottom of the cylindrical portion 55 to trap air within the cavity 58. Although it has been considered to fill the cavity 58 with polystyrene to enhance the insulative properties of the lid 50, it has been found that the trapped air provides adequate insulation.

The circular cover 54 includes a threaded outer peripheral wall 60 for mating engagement with the threaded wall 40 extending between the peripheral edges of the annular regions 36, 38. The mating threads provided on both the lid 50 and the receptacle 16 are designed to permit air-flow therebetween and thus, do not provide an air-tight seal. This permits the lid 50 to be removeably secured to the receptacle 16 while providing an air vent when the lid 50 is secured to the receptacle 16. The undersurface of the cover 54 has a pair of diametrically opposed recesses 62 formed therein. Each recess extends from the plug 52 to the peripheral wall 60 to define cavities 64 between the upper surface of the inner annular region 36 and the undersurface of the cover 54 when the lid 50 is threadably engaged with the container 10. The recesses 62 are positioned so that one of the cavities 64 communicates with the groove 48 when the lid is fully secured to the container 10.

A funnel-shaped passage 70 is also provided through the lid 50 and extends from the upper surface of the cover 54 through the plug 52. The passage 70 includes a cylindrical portion 72 extending the length of the plug 52 and a collecting reservoir 74 of greater diameter than the cylindrical portion 72 disposed thereabove. A portion 74a of the collecting reservoir 74 adjacent the cylindrical portion 72 is complimentary in shape to a floatable ball 82 resting in the reservoir 74. A small annular ridge 75 is formed at the bottom of reservoir portion 74a and surrounds the opening of the cylindrical portion 72. The upper portion 76 of the interior wall of the collecting reservoir 74 is threaded to receive removeably a cap 78. The floatable ball 82 has a diameter greater than the cylindrical portion 72 and rests on the annular ridge 75 so that the periphery of the floatable ball 82 is spaced from the walls of the collecting reservoir 74 yet allows the ball 82 to overlie the opening to the cylindrical portion 72.

The cap 78 has a generally concave upper surface 78b. A passage 80 is formed through the centre of the cap 78 and has a diameter larger than the diameter of the cylindrical portion 72. A cylindrical vent 81 is also formed through the cap 78 and has side walls extending above the upper surface 78b of the cap so that the upper opening of the vent 81 is level with the outer edge of the cap. In addition, the peripheral wall of the cap has spaced grooves 78a formed therein to facilitate rotation of the cap 78 to engage and disengage the cap 78 with and from the threaded wall of the collecting reservoir 74. The undersurface of the cap 78 includes three downwardly extending spaced stops 83 surrounding the passage 80.

A pair of diametrically opposed bands 84 are formed on the upper surface of the lid 50 and extend from the outer wall of the collecting reservoir 74 to the peripheral wall 60 of the lid. The bands 84 are located above the recesses 62 and have vent holes 86 formed therethrough to permit the cavities 64 to communicate with the atmosphere when the lid 50 is placed on the container 10.

The operation of the thermal container 10 will now be described. When it is desired to fill the thermal reservoir 43 with a beverage such as hot coffee, liquid is poured into the collecting reservoir 54 via the passage 80 and begins to fill the reservoir. Since the diameter of the passage 80 is larger than the diameter of the cylindrical portion, liquid entering the reservoir 54 collects therein. The vent 81 provides a path for the expression of air from the collecting reservoir 74 to avoid air from passing back through the passage 80 and inhibiting liquid flow into the collecting reservoir. The upper opening to the vent 81 is raised with respect to the opening of the passage 80 to prevent both the vent and the passage from being submerged.

As the collecting reservoir 54 is filled, liquid passes between the periphery of the ball 82 and the walls of the collecting reservoir thereby causing the ball 82 to float in the liquid and lift from the annular ridge 75 thereby exposing cylindrical portion 72 of the passage 70. This permits the liquid collecting in the reservoir 54 to fall under the influence of gravity into the thermal reservoir 43 within the receptacle 16 via the cylindrical portion 72. The provision of the annular ridge 75 ensures that a vacuum is not created resulting in jamming of the floatable ball 82 within the lower portion 74a of the collecting reservoir 74 which of course may cause overflowing of the liquid entering the lid 50. The stops 83 extending from the undersurface of the cap 78 prevent the ball 82 from blocking the passage 80 when it is floating in liquid collected in the reservoir 74, thereby inhibiting liquid from pouring over the outer peripheral edge of the cap 78.

As liquid enters the thermal reservoir 43, air must be expressed from the reservoir 43. To inhibit air from passing back through the passage 70 provided in the lid 50, which will of course cause bubbling of the liquid held by the collecting reservoir 74 and reduce the flow of liquid entering the thermal reservoir 43, the gap 59, the groove 48, recesses 62, vent holes 86 and threaded arrangement between the receptacle 16 and the lid 50 are provided.

In particular, as fluid enters the thermal reservoir 43, the air expressed from the reservoir 43 passes between the outer wall of the cylindrical portion 55 of the plug 52 and through the groove 48 into the cavity 64 in communication with the groove 48. From the cavity 64, the air is released into the atmosphere via the vent hole 86 formed in the band 84 and via the opening formed between the threads of the lid 50 and the receptacle 16. This permits air to be expressed from the thermal reservoir 43 without impeding fluid flow into the reservoir 43.

When a desired amount of fluid has been poured into the thermal reservoir 43 and the liquid held in the collecting reservoir 74 has drained into the reservoir 43, the floatable ball 82 reseals the opening to the thermal reservoir 43 thereby reducing heat loss of the fluid. Moreover, since the interior of the plug 52 is insulated due to the trapped air in the cavity 58, heat loss of the fluid is further reduced. The provision of the groove 48, cavities 64 and vent holes 86 do not increase heat loss to a large extent since the convection forces are not sufficiently large to create rapid air flow therethrough. When it is desired to dispense the stored liquid, the lock 26 is placed in an inoperable condition and the dispensing handle 24 is pushed downwards. This, of course, opens the valve in the reservoir 43 allowing liquid to be expressed therefrom via the spout.

The present lid and container provides advantages in that the container assembly can be filled easily and at a fast rate without requiring removal of the lid. This is achieved by providing a simple venting arrangement. Moreover, the present lid and container provide advantages in that spillage is controlled in the event of accidental overturning of the container and heat loss of the fluid stored in the container is reduced due to the sealing arrangement of the floatable ball and the insulated lid. Moreover, the provision of the annular ridge in bottom of the collecting reservoir and the stops provided on the undersurface of the cap inhibit the ball from interfering with liquid flow through the cylindrical portion 72 and the passage 80 respectively.

It should be apparent to one of skill in the art that modifications and variations can be made to the present invention without departing from the scope thereof a defined by the appended claims.

I claim:

1. In combination, a container to be filled with liquid having an upper end and a lid removeably securable to said container to cover said upper end, said container having a passage formed through said upper end to provide an opening to a reservoir disposed within said container, a wall of said passage having a groove formed therein extending the length thereof, said lid including:
   a plug for seating in said passage;
   a liquid entrance formed in said lid and extending through said plug to permit fluid to enter said reservoir without removal of said lid from said container; and
   vent means provided through said lid, said vent means communicating with said groove when said lid is secured to said container whereby said groove and vent means provide a path for the expression of air from said reservoir when fluid enters said reservoir via said liquid entrance.

2. The combination as defined in claim 1 wherein said vent means includes a recess formed in the under surface of said lid, said recess overlying an annular region adjacent the upper end of said container and communicating with said passage when said lid is secured to said container to define a cavity; and a bore extending through said lid and communicating with said cavity.

3. The combination as defined in claim 2 wherein said liquid entrance is in the form of a funnel-shaped passage having its reduced diameter end adjacent said plug, said liquid entrance further including a floatable ball resting in said funnel-shaped passage, said ball sealing said funnel-shaped passage in the absence of fluid entering said liquid entrance.

4. The combination as defined in claim 3 wherein said funnel-shaped passage defines a cylindrical portion and a generally conical collecting reservoir having a generally semi-spherical depression formed therein adjacent said cylindrical portion of a shape complimentary to said ball, said collecting reservoir further including an annular ridge surrounding said cylindrical portion to space said ball from the walls of said collecting reservoir when said ball seals said funnel-shaped passage.

5. The combination as defined in claim 4 wherein said lid further includes a cap for overlying said funnel-shaped passage, said cap having a hole provided therethrough, said hole having a greater diameter relative to said cylindrical portion.

6. The combination as defined in claim 5 wherein said cap further includes stop means for inhibiting said ball from blocking said hole when said ball is floating in liquid collected in said collecting reservoir.

7. The combination as defined in claim 6 wherein said stop means is in the form of a plurality of spaced stops extending downwardly from said cap and surrounding said hole.

8. The combination as defined in claim 7 wherein said cap is threadably engaged with said lid and removable therefrom.

9. The combination as defined in claim 8 wherein said cap further includes spaced grooves formed about the peripheral wall thereof to facilitate engagement and disengagement of said cap on and from said lid.

10. The combination as defined in claim 1 wherein said passage and said plug are funnel shaped.

11. The combination as defined in claim 1 wherein said plug is hollow and filled with trapped air, said trapped air providing insulation for said lid.

12. The combination as defined in claim 1 wherein said lid is threadably engaged with said container and wherein the threading engagement between said lid and said container defines a second vent means for air expressed from said reservoir via said groove.

13. The combination as defined in claim 12 wherein said vent means is in the form of a pair of diametrically opposed recesses formed in the undersurface of said lid, one of said recesses communicating with said passage when said lid is threadably engaged with said container to define a cavity; and a pair of bores extending through said lid, each bore being associated with one respective ones of said recesses, one of said bores communicating with said cavity when said associated recess communicates with said passage.

* * * * *